(12) United States Patent
Nuotio et al.

(10) Patent No.: US 10,691,586 B2
(45) Date of Patent: Jun. 23, 2020

(54) APPARATUS AND METHOD FOR SOFTWARE SELF-TEST (71) Applicant: Huawei Technologies Co., Ltd., Shenzhen (CN)

(72) Inventors: Pekka Nuotio, Kista (SE); Panu Johansson, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/048,027

(22) Filed: Jul. 27, 2018

(65) Prior Publication Data

US 2018/0373623 A1 Dec. 27, 2018

Related U.S. Application Data

(63) Continuation of application No. PCT/EP2016/070028, filed on Aug. 25, 2016.

(51) Int. Cl.
*G06F 9/44* (2018.01)
*G06F 11/36* (2006.01)

(52) U.S. Cl.
CPC ...... *G06F 11/3688* (2013.01); *G06F 11/3612* (2013.01); *G06F 11/3664* (2013.01); *G06F 11/3692* (2013.01)

(58) Field of Classification Search
CPC ............. G06F 11/3612; G06F 11/3664; G06F 11/3688; G06F 11/3692
See application file for complete search history.

(56) References Cited

U.S. PATENT DOCUMENTS

| 4,231,087 A | 10/1980 | Hunsberger et al. |
| 6,622,184 B1 | 9/2003 | Tabe et al. |

(Continued)

FOREIGN PATENT DOCUMENTS

| CN | 1821977 A | 8/2006 |
| CN | 102103552 A | 6/2011 |

(Continued)

OTHER PUBLICATIONS

Daniel Milton, Built-In Self Test of Configurable Memory Resources in Field Programmable Gate Arrays, citeseerx, Dec. 17, 2007, retrieved online on Jan. 30, 2020, pp. 1-151. Retrieved from Internet: <URL: http://citeseerx.ist.psu.edu/viewdoc/download?doi=10.1.1.399.258&rep=rep1&type=pdf>. (Year: 2007).*

(Continued)

*Primary Examiner* — Hanh Thi-Minh Bui
(74) *Attorney, Agent, or Firm* — Leydig, Voit & Mayer, Ltd.

(57) ABSTRACT

A computing apparatus configured to perform software verification and validation is provided. The computing apparatus includes a processor coupled to a main memory, and a write only memory module, wherein the processor is configured to execute an application under test. The application under test is configured to write output data to the main memory. The processor directs the output data to the write only memory module and transfers the output data to the main memory when the execution of the application under test is successful, or erases the output data from the write only memory module when the execution of the application under test is unsuccessful.

15 Claims, 3 Drawing Sheets

(56) References Cited

U.S. PATENT DOCUMENTS

| | | | |
|---|---|---|---|
| 9,342,257 B2 | 5/2016 | Park et al. | |
| 2007/0150755 A1* | 6/2007 | Makii | G06F 21/12 713/193 |
| 2012/0278892 A1* | 11/2012 | Turbin | G06F 21/53 726/24 |
| 2013/0318498 A1 | 11/2013 | Mittal et al. | |
| 2015/0134892 A1 | 5/2015 | Coda | |
| 2015/0301108 A1* | 10/2015 | Hamid | G01R 31/3177 714/724 |
| 2017/0046222 A1* | 2/2017 | Kern | G11C 17/146 |

FOREIGN PATENT DOCUMENTS

| | | |
|---|---|---|
| CN | 102165425 A | 8/2011 |
| CN | 102541765 A | 7/2012 |
| CN | 104662552 A | 5/2015 |

OTHER PUBLICATIONS

"Self-test device," MTS, https://www3.bellmts.ca/mts/support/phone+services/wiring/self-test+device (Retrieved from Internet on Sep. 12, 2018).

* cited by examiner

APPARATUS AND METHOD FOR SOFTWARE SELF-TEST

CROSS-REFERENCE TO RELATED APPLICATIONS

This application is a continuation of International Application No. PCT/EP2016/070028, filed on Aug. 25, 2016, which is incorporated herein by reference in its entirety.

TECHNICAL FIELD

Embodiments of the present disclosure relate generally to software verification and validation, and more particularly to self-testing of software applications in computing devices.

BACKGROUND

Software verification and validation, also referred to herein as V&V or self-test, ensures that software programs and applications meet user and/or manufacturer requirements and expected quality attributes throughout their lifecycle. Proper operation of software applications may be assessed by running power on self-tests when devices are initially turned on. However, it is becoming increasingly common for devices, such as cell phones and set top boxes, to remain on for extended periods of time. Therefore it is desirable to continuously monitor software applications to ensure safe and proper operation. Continuous verification and validation requires that self-tests be restarted periodically after the previous test sequence has completed. This can often lead to undesirable delays or extended periods where the device is unusable. It is of particular importance to continuously verify and validate applications running on devices used for safety or security related operations as these devices are often the target of malicious attackers and the consequences of failures can be serious.

Software verification and validation may be performed by generating artificial data for each test sequence. This requires prior knowledge of software operations. The generation of erroneous data can lead to test failures which may result in false negative determinations. Also, the resulting output data can be intermixed with real data in ways that make it difficult to remove the artificial information.

A corrupted or maliciously altered software application may affect data in a computer's main memory. Corrupt data may be erroneous and useless, or it may introduce an undesirable security breach or an unknown security threat. An application may also write to protected portions of memory, such as the master boot record, and render a device useless or take control of the device for malevolent purposes.

Thus, there is a need for improved apparatus and methods that can perform continuous verification and validation of software applications while preventing these applications from causing harm to the devices on which they are running. Accordingly, it would be desirable to provide a method and apparatus that addresses at least some of the problems identified above.

SUMMARY

It is an object of the embodiments of the present invention to provide an apparatus and method for verifying and validating software applications while protecting the computing apparatus from corruption, reducing risk of viral attacks, and protect data in the memory of the computer.

This object is solved by the subject matter of the independent claims. Further advantageous modifications can be found in the dependent claims.

According to a first aspect of the invention the above and further objects and advantages are obtained by a computing apparatus that includes a processor coupled to a main memory and a write only memory module. The processor is configured to execute an application under test. The application under test is configured to write output data to the main memory. The processor directs the output data to the write only memory module and transfers the output data to the main memory when the execution of the application under test is successful, or erases the output data from the write only memory module when the execution of the application under test is unsuccessful. The aspects of the disclosed embodiments verify and validate software applications while protecting the computing apparatus from corruption, reducing risk of viral attacks, and protect data in the memory of the computer.

In a first possible implementation form of the computing apparatus according to the first aspect, the processor is configured to detect that the execution of the application under test is successful or unsuccessful by verifying and validating the output data. Verifying and validating the output data allows flexibility in determining whether execution of the application under test is successful.

In a second possible implementation form of the computing apparatus according to the first aspect as such or according to the first possible implementation form, the processor is configured to detect that the execution of the application under test is unsuccessful when the output data is written to an invalid location in the write only memory module. Writing to invalid memory locations is a common attack used by malicious applications, thus detecting and making an unsuccessful determination based on writes to invalid locations has the advantage of detecting this type of malicious attack.

In a third possible implementation form of the computing apparatus according to the first aspect as such or according to the first or second possible implementation forms of the first aspect, the write only memory module is configured to return a successful write signal to the application under test when the output data is written to an invalid memory location. Returning a successful write signal to a malicious application has the advantage of preventing the malicious application from knowing it has been detected.

In a fourth possible implementation form of the computing apparatus according to the first aspect as such or according to any of the preceding possible implementation forms of the first aspect, the write only memory module comprises a software driver application, wherein the software driver application is configured to adapt a portion of the main memory as a write only memory cache. Using a software driver to configure a portion of the main memory to act as a write only memory cache allows the disclosed methods and apparatus to be implemented in a computing apparatus that does not have any hardware based write only memory cache support.

In a fifth possible implementation form of the computing apparatus according to the first aspect as such or to any of the preceding possible implementation forms of the first aspect, the write only memory module comprises a protected computer memory. Implementing the write only memory module in a protected computer memory provides additional security to ensure malicious data does not leak into the main memory.

In a sixth possible implementation form of the computing apparatus according to the first aspect as such or according to any of the preceding possible implementation forms of the first aspect, the processor is configured to execute a plurality of applications, wherein the plurality of applications comprises the application under test and one or more further applications, and wherein the write only memory module is configured to allow the application under test to access the output data and is configured to isolate the output data from the one or more other applications. This has the advantage of allowing the application under test to both read and write data to the protected memory cache but protects all other executing applications from reading the output data until verification and validation has been completed and the output data is moved from the memory cache to the main memory.

In a seventh possible implementation form of the computing apparatus according to the first aspect as such or according to any of the preceding possible implementation forms of the first aspect, the processor is configured to provide real input data to the application under test during the execution of the application under test. The use of real input data eliminates the need to generate special test data and also avoids making special test runs.

In an eighth possible implementation form of the computing apparatus according to the first aspect as such or according to any of the preceding possible implementation forms of the first aspect, the computing apparatus is a mobile computing device. Mobile computing devices are especially vulnerable to attacks due to the sensitive nature of the applications running thereon, and can therefore benefit from improved software self-test methods and apparatus.

According to a second aspect of the invention the above and further objects and advantages are obtained by a method for testing software applications, where the method executes an application under test and directs output data generated by the application under test to a write only memory module. When the execution of the application under test is successful, the output data is transferred to a computer main memory, and when execution of the application under test is unsuccessful the output data is erased. The aspects of the disclosed embodiments verify and validate software applications while protecting the computing apparatus from corruption, reducing risk of viral attacks, and protect data in the memory of the computer.

In a first possible implementation form of the method according to the second aspect the output data is verified and validated before it is written to a write only memory cache. Performing verification and validation on the output data before it is written to the memory cache allows early detection of an unsuccessful execution.

In a second possible implementation form of the method according to the second aspect as such or according to the first implementation form of the second aspect, detecting that the execution of the application under test is successful or unsuccessful is based on the verification and validation of the output data. Using verification and validation to detect an unsuccessful execution provides flexibility in the criteria used for detection.

In a third possible implementation form of the method according to the second aspect as such or according to the first or second possible implementation forms of the second aspect, detecting that the execution of the application under test is unsuccessful occurs when the output data is written to an invalid location in the write only memory module. This has the advantage of detecting many types of malicious applications and protecting sensitive data which the application under test is not authorized to modify.

In a fourth possible implementation form of the method according to the second aspect as such or according to the first through third implementation forms of the second aspect, a successful write signal is returned to the application under test when the output data is written to an invalid location in the write only memory cache. This prevents malicious applications from detecting that the malicious application has been detected and that the attack has been intercepted.

According to a third aspect of the present invention the above and further objects and advantages are obtained by a computer program comprising non-transitory computer program instructions that when executed by a processor cause the processor to execute the method according to the second aspect as such or to any of the implementation forms of the second aspect.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
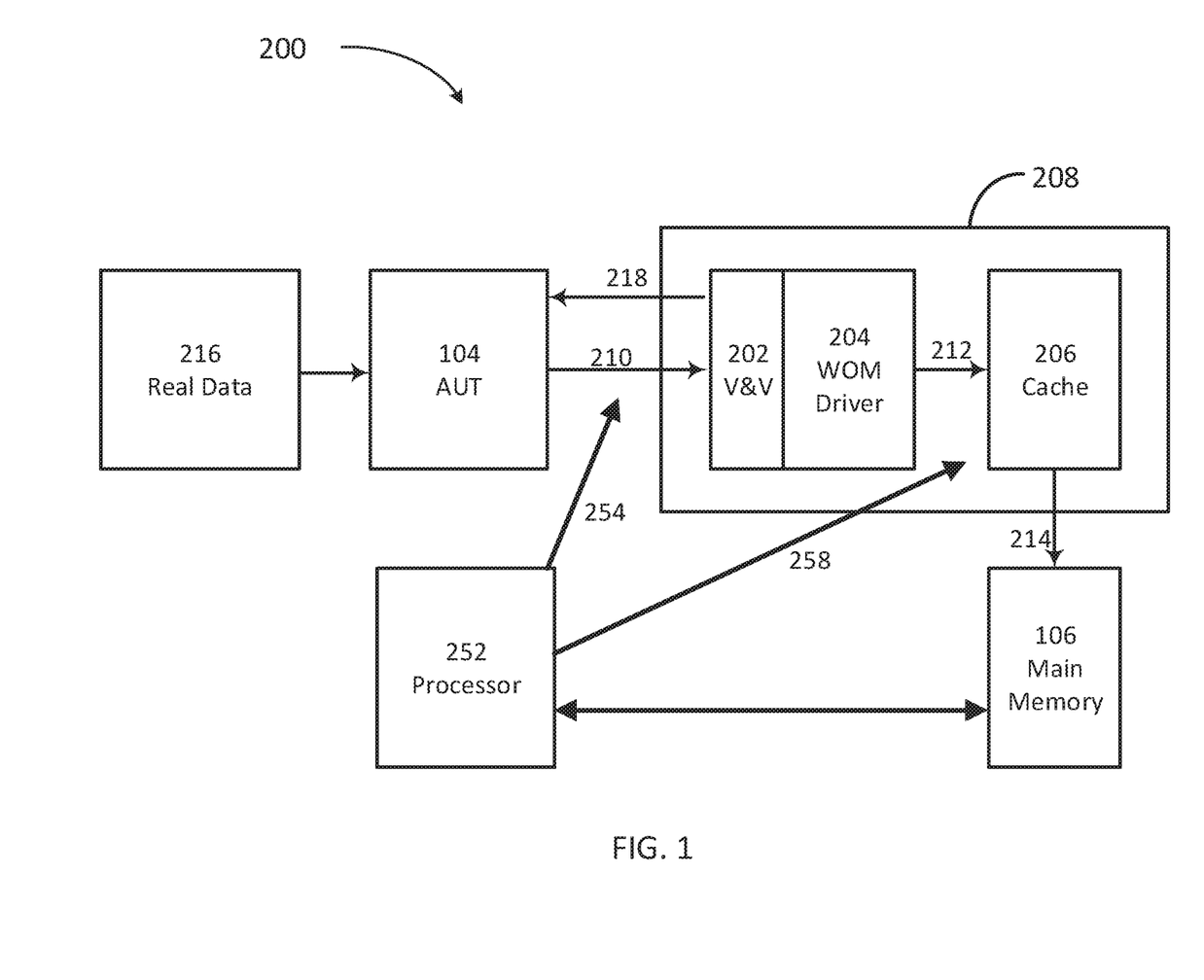
FIG. 1 illustrates a block diagram of an exemplary computing apparatus that includes a write only memory module incorporating aspects of the disclosed embodiments.

FIG. 1 illustrates a block diagram of a computing apparatus 200 incorporating aspects of the disclosed embodiments. The aspects of the disclosed embodiments are configured to protect the main memory 106 of a computing apparatus 200 from corruption by a malicious or otherwise corrupted application under test through the use of a write only memory module 208. The term write only memory (WOM) began as a term for describing the opposite of a read only memory (ROM), as computer memory that may be written to but not read. WOM has found uses in computing apparatus for example as memory mapped output devices, and as hardware security devices configured to allow cryptographic keys to be written to them but not read.

As is shown in FIG. 1 and will be further described below, a processor 252 of a computing apparatus 200 is coupled to a main memory device 106, and a write only memory module 208. In this example, the processor 252 is configured to execute an application under test 104 and the application under test 104 is configured to write output data 210 to the main memory 106. According to the aspects of the disclosed embodiments, the processor 252 is configured to direct the output data 210 to the write only memory module 208 and transfer the output data 210 to the main memory 106 when the execution of the application under test 104 is successful. If the execution of the application under test 104 is unsuccessful, the processor 252 can be configured to cause the output data 210 to be erased or otherwise cleared from the write only memory module 208 (e.g. overwritten) in a manner so that the output data 210 does not pose a risk to the main memory 106 or other aspects of the computing apparatus 200. The aspects of the disclosed embodiments verify and validate software applications while protecting the computing apparatus from corruption, reducing risk of viral attacks, and protect data in the memory of the computer.

Figure 2:
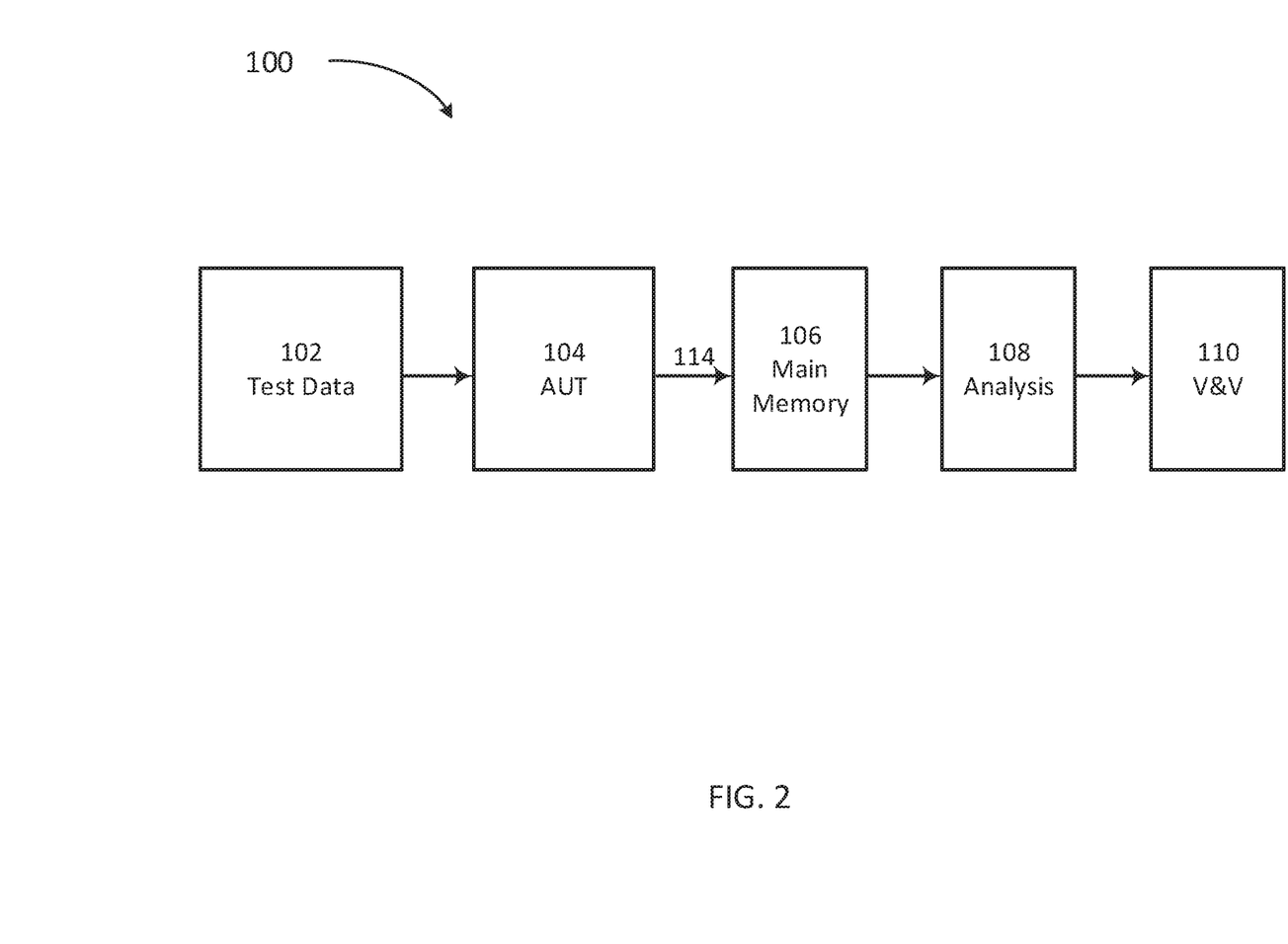
FIG. 2 illustrates a block diagram of a conventional method used to self-test software applications.

FIG. 2 shows a block diagram illustrating a conventional approach 100 for verifying and validating (V&V) software applications. In this conventional approach 100, the application under test 104, which may be or include a malicious software application such as an application that has been infected by a virus or an application that has been otherwise corrupted, is executed and allowed to write its output data 114 to the main memory 106 of a computing apparatus. The test data 102 used to exercise the application under test 104 during the test execution may be any appropriate input data configured to exercise operation of the application under test 104. Once the test sequence or test execution has completed, the output data 114 that was written to the main memory 106 is analyzed 108 and used by verification and validation routines 110 to determine whether the application under test 104 is operating correctly or as desired.

There are several problems with this conventional approach 100. Because the output 114 data has already been written to the main memory 106 prior to analysis 108 and verification and validation, any harm caused by the output data 114 has already occurred and may be difficult to undo. A virus may have already irrevocably infected other applications or the operating system. The use of test data 102, which is fake data generated for the purpose of exercising the application under test 104 during a test sequence, also may poses risks. For example the test data 102 may include false information which would be difficult to separate and remove from existing real data. Also the test data 102 may cause the application under test 104 to modify sensitive portions of the main memory 106 such as the master boot record, and these modifications may go undetected by the analysis 108 and verification and validation routines 110. Generating artificial test data 102 for use during test sequences can be error prone and requires additional test time for generation. Generation of test data 102 may problematic due to the need for in-depth knowledge of the application under test 104 which may not be available during generation of the test data 102.

Additionally, the output data 114 from the application under test 104 may be correct but may be modified by a malicious application which has inserted itself into the process before writing the output data 114 to the main memory 106. Many software viruses propagate themselves using this technique.

Unlike the conventional systems, such as that illustrated in FIG. 2, according to the aspects of the disclosed embodiments, in the computing apparatus 200 shown in FIG. 1, the output data 210 generated by an application under test 104 is diverted to the WOM module 208 and is only written to the main memory 106 after all data has passed verification and validation. The aspects of the disclosed embodiments provide for continuous verification and validation of software applications while preventing these applications from causing harm to the devices on which they are running.

The computing apparatus 200 of the disclosed embodiments may be any general purpose computing apparatus. In certain embodiments it is advantageous for the computing apparatus 200 to be a mobile computing or communication device such as for example, a smart phone, phablet, tablet, or other connected portable device.

In one embodiment, the computing apparatus 200 of the disclosed embodiments includes a processor 252 or other appropriate processing device, connected or otherwise coupled to the main memory 106. The write only memory module 208 is configured to accept memory write operations, or output data 210, from the application under test 104, and to store the output data 210 in a protected memory cache 206. The write only memory module 208 can write 214 the output data 210 to the main memory 106 after the memory cache 206 has passed verification and validation as is generally described herein.

The processor 252 may be a single processing device or may comprise a plurality of processing devices including special purpose devices, such as for example, digital signal processing (DSP) devices, microprocessors, specialized processing devices, parallel processing cores, or general purpose computer processors. The processor 252 is configured to read program instructions from the main memory 106 and perform the methods and processes described herein. The processor 252 may also include a central processing unit (CPU) working in tandem with a graphics processing unit (GPU) which may include a digital signal processor (DSP) or other specialized graphics processing hardware.

The main memory 106 may be a combination of various types of volatile and non-volatile computer memory such as for example read only memory (ROM), random access memory (RAM), synchronous dynamic random-access memory (SDRAM) or double data rate DDR-SDRAM, magnetic or optical disk, or other types of computer memory. The main memory 106 may also include non-volatile memory (NVM) such as hard disk drives (HDD), solid state drives (SDD), optical disk drives (ODD), network attached storage (NAS), etc. The main memory 106 may include any appropriate data or information storage/retrieval devices that may be used by a computing apparatus 200 to store and/or retrieve data or information.

The main memory 106 is generally configured to store computer program instructions that may be accessed and executed by the processor 252 to cause the processor to perform a variety of desirable computer implemented processes or methods such as the software testing methods described herein. The term "main memory" as used herein generally refers to all the various types of storage media available for storing and/or retrieving information by a computing apparatus, such as the computing apparatus 200.

The WOM module 208 includes a WOM driver 204 and verification and validation routines 202, along with a cache 206. The verification and validation routines 202 are configured to analyze the output data 210 received from the application under test 104 and may also perform verification and validation on the output data 210 after the WOM driver 204 has written 212 the output data 210 to the cache 206.

The WOM module 208 also includes a cache 206 which is a protected computer memory configured to be used as temporary storage for the output data 210 written by the application under test 104. The cache 206 is protected memory that except in certain embodiments cannot be written to, read, or otherwise accessed by any applications or processes outside of the WOM module 208.

The WOM module 208 includes a WOM driver 204 that in conjunction with the processor 252 controls operation of the WOM module 208. The cache 206 may be a specially constructed computer memory configured to protect the cache from access. Alternatively, in certain embodiments the WOM driver 204 may be configured to configure a portion of the main memory 106 to operate as a protected cache 206.

During normal execution, output data 210 form the application under test 104 would be written to the main memory 106, such as is shown in the example of FIG. 2. In contrast, in accordance with the aspects of the disclosed embodiments, during a test sequence or test execution, the processor 252 directs 254 all output data 210 from the application under test 104 to the WOM module 208. Having the processor 252 direct the output data 210 to the WOM Module 208 means that the output data 210 is not allowed to modify the main memory 106. Instead, the output data 210 is sent to the WOM module 208 where it undergoes verification and validation and is stored in the cache 206. After the output data 210 has been stored in the cache it may be analyzed and may undergo additional verification and validation checks.

When all analysis and verification and validation passes successfully, the output data 210 is moved from the cache 206 to the main memory 106 where it may become generally available to other applications and processes running on the computing apparatus 200. Because the output data 210 from the application under test 104 is not written to main memory 106 until after it has been determined to be safe, real data 216 may be used during testing of the application under test 104 without risk of corrupting the main memory 106. This avoids the need for special or separate test runs and obviates the need for generation of fake or test data.

When the output data 210 is found to be corrupted or otherwise fails during verification and validation, the output data 210 is not sent or written to the main memory 106. In one embodiment, the processor 252 is configured to cause 258 the cache 206 to be erased or otherwise cleared, thereby preventing any corrupted or undesired data from entering or modifying the main memory 106.

It is not uncommon for malicious programs, such as software viruses, to attempt to access or modify restricted portions of the main memory. For example a virus may try to modify the master boot record of the primary boot device and take control of the computing apparatus during its next boot sequence. A malicious application often is configured to attempt several different attacks so when one attack is detected or fails, the virus tries again with a different attack. To avoid this problem and minimize attacks, the WOM module 208 is configured to return a successful write signal 218 to the application under test 104 whenever the output data 210 is directed to an invalid or prohibited memory location. By returning a successful write signal 218, the application under test 104, which in this case is a malicious application under test, does not know it was detected. In this manner, by believing that its write operation was successful, the application under test 104 may not attempt additional attacks, ostensibly to lower its risk of detection. However, the WOM module 208 does detect the illegal write request and the verification and validation fails. This allows the processor 252 to cause 258 the cache 206 to be erased, when desired mark, the application under test 104 as malicious or otherwise corrupted.

The computing apparatus 200 may be configured to execute several applications concurrently all using the same processor 252 and main memory 106. It is important that the output data 210 produced by the application under test 104 be prevented from influencing any of the concurrently executing applications until after all the output data 210 has passed verification and validation. However, the application under test 104 may attempt to access its own output data 210 after it has been written. In certain embodiments it is advantageous to configure the WOM module 208 to prevent read access to the cache 206 by all concurrently executing applications or processes while allowing the application under test 104 to retrieve its own output data 210. By configuring the WOM module 208 in this way, the application under test 104 is prevented from detecting that it is in a test mode while still fully protecting all other applications and processes executing concurrently on the computing apparatus from any risk of corruption by the application under test 104.

Figure 3:
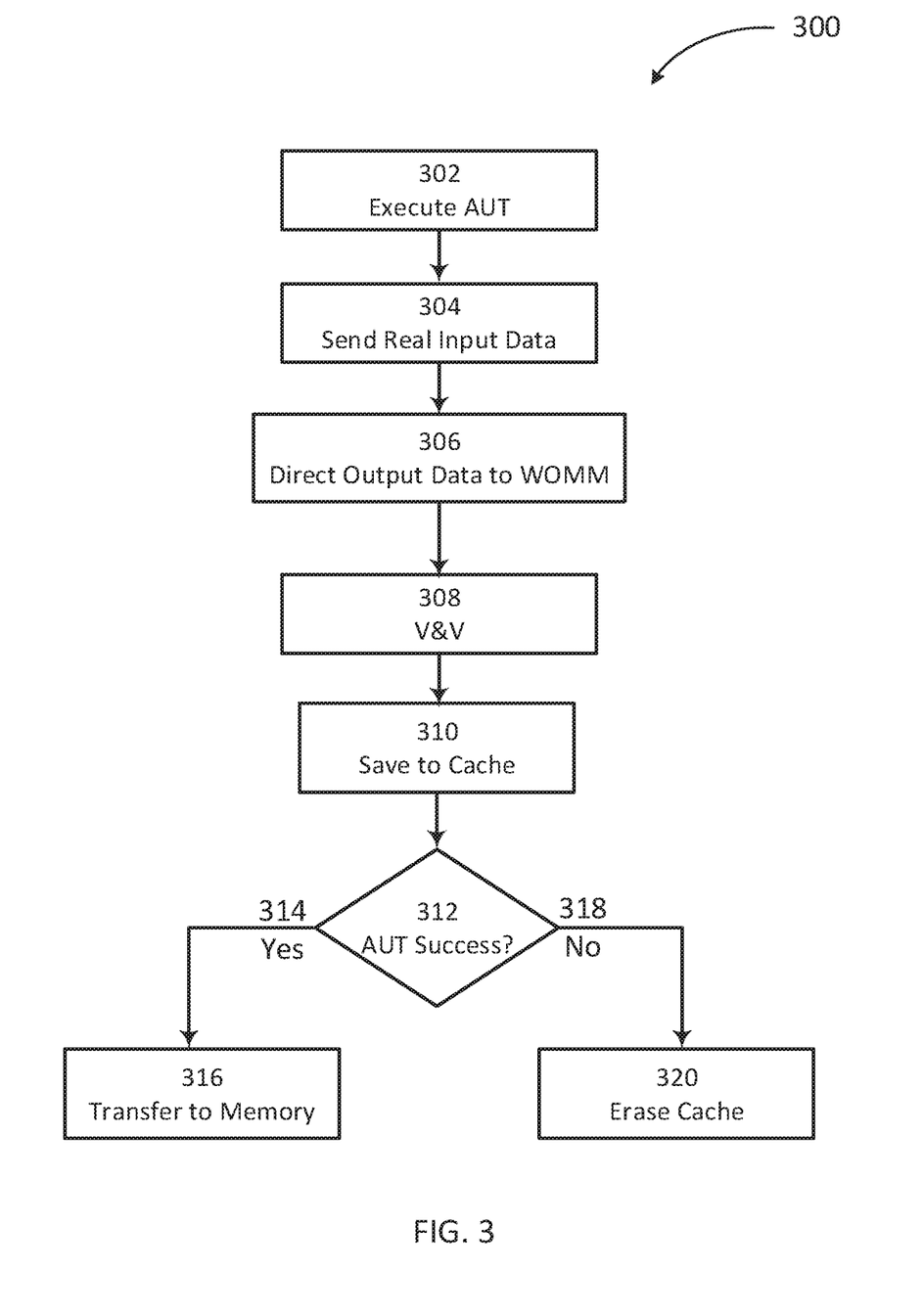
FIG. 3 illustrates a flow chart of an exemplary method for testing software applications incorporating aspects of the disclosed embodiments.

Referring now to FIG. 3 there can be seen a flow chart of an exemplary method 300 for testing software applications in accordance with the aspects of the disclosed embodiments. The exemplary method 300 may be used to safely execute untrusted applications without risk of corruption. As shown in FIG. 3, the method 300 begins by executing 302 an application under test. In this example the application under test may be an untrusted application or one that may have been infected by a virus or otherwise corrupted. The application under test is provided 304 with real input data rather than fake or test data. Using real input data prevents the need for special test runs that can consume significant amounts of processor time without producing any useful results.

All output data generated by the application under test is directed 306 to a write only memory module, such as the write only memory module 208 described above with respect to FIG. 2. Directing 306 the output data to the write only memory module means that all output data generated by the application under test, that would under normal conditions be written to a main memory, is intercepted and written instead to the write only memory module.

The output data undergoes a verification and validation process 308 and is written 310 to a protected memory cache where it is isolated from the remainder of a computing device's main memory. It is determined 312 if the execution of the application under test has been successful 314 or failed 318. If execution of the application under test is determined 312 to be successful 314, the data from the cache is transferred 316 to or written to the main memory.

If it is determined 312 that execution of the application under test is unsuccessful or has failed 318, the cache is erased 320. For example, as soon as the application under test attempts to write to a restricted memory location, it is determined 312 that the execution of the application under test has failed 318. Upon determining 312 that the execution to the application under test has failed 318, all data in the cache may be erased 316, and when desired execution of the application under test may be halted.

In certain embodiments it is desirable to avoid having the application under test know that an attempted write operation to a restricted portion of the main memory was detected. This is useful for example to prevent a software virus from attempting subsequent attacks. In these embodiments the method 300 may be configured to return a successful write signal to the application under test after an illegal write operation is detected, thereby making it appear to the application under test that the write operation was successful even though the WOM Module detected and prevented the illegal write operation.

The aspects of the disclosed embodiments are configured to perform continuous verification and validation of software applications while preventing these applications from causing harm to the devices on which they are running. Output data from an application under test is written to a write only memory where it is verified and validated prior to transfer to a main memory. In this manner, the aspects of the disclosed embodiments verify and validate software applications while protecting the computing apparatus from corruption, reducing risk of viral attacks, and protect data in the memory of the computer.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computing apparatus, comprising a processor coupled to a main memory and a write only memory module, wherein the processor is configured to:
   execute a plurality of applications, including an application under test and one or more other applications, wherein the application under test is configured to write output data to the main memory;
   direct the output data to the write only memory module;
   transfer the output data to the main memory in response to the execution of the application under test being successful; and
   erase the output data from the write only memory module in response to the execution of the application under test being unsuccessful,
      wherein the processor is further configured to detect that the execution of the application under test is unsuccessful when the output data is written to an invalid location in the write only memory module, and
      wherein the write only memory module is configured to allow the application under test to access the output data and isolate the output data from output data generated by the one or more other applications.

2. The computing apparatus according to claim 1, wherein the processor is further configured to detect that the execution of the application under test is successful or unsuccessful by verifying and validating the output data from the application under test.

3. The computing apparatus according to claim 1, wherein the write only memory module is further configured to return a successful write signal to the application under test when the output data from the application under test is written to an invalid memory location.

4. The computing apparatus according to claim 1, wherein the write only memory module comprises a software driver application, which is configured to adapt a portion of the main memory as a write only memory cache.

5. The computing apparatus according to claim 1, wherein the write only memory module comprises a protected computer memory.

6. The computing apparatus according to claim 1, wherein the processor is further configured to provide real input data to the application under test during the execution of the application under test.

7. The computing apparatus according to claim 1, wherein the computing apparatus is a mobile computing device.

8. A method for testing software applications, the method comprising:
   executing an application under test and one or more other applications;
   directing output data generated by the application under test to a write only memory module so as to allow the application under test to access the output data while isolating the output data of the application under test from output data generated by the one or more other applications;
   transferring the output data from the application under test to a computer main memory in response to the execution of the application under test being successful; and
   erasing the output data from the application under test in response to the execution of the application under test being unsuccessful,
      wherein the execution of the application under test is determined to be unsuccessful when the output data from the application under test is written to an invalid location in the write only memory module.

9. The method of claim 8, further comprising verifying and validating the output data from the application under test before the output data from the application under test is written to a write only memory cache of the write only memory module.

10. The method of claim 9, further comprising determining that the execution of the application under test is successful or unsuccessful based on a verification and validation of the output data from the application under test.

11. The method of claim 8, further comprising returning a successful write signal to the application under test when the output data from the application under test is written to an invalid location in the write only memory cache.

12. A non-transitory computer readable medium having a program code stored thereon which, when executed by a computer, causes the computer to perform a method for testing software applications, the method comprising:
   executing an application under test and one or more other applications;
   directing output data generated by the application under test to a write only memory module so as to allow the application under test to access the output data while isolating the output data from output data generated by the one or more other applications;
   transferring the output data from the application under test to a computer main memory in response to the execution of the application under test being successful; and
   erasing the output data from the application under test in response to the execution of the application under test being unsuccessful,
      wherein the execution of the application under test is determined to be successful or unsuccessful based on a verification and validation of the output data from the application under test.

13. The non-transitory computer readable medium of claim 12, wherein the method further comprises verifying and validating the output data from the application under test before the output data from the application under test is written to a write only memory cache of the write only memory module.

14. The non-transitory computer readable medium of claim 12, wherein the method further comprises determining that the execution of the application under test is successful or unsuccessful based on the verification and validation of the output data from the application under test.

15. The non-transitory computer readable medium of claim 12, wherein the method further comprises returning a successful write signal to the application under test when the output data from the application under test is written to an invalid location in a write only memory cache of the write only memory module.

\* \* \* \* \*

UNITED STATES PATENT AND TRADEMARK OFFICE
CERTIFICATE OF CORRECTION

| | | |
|---|---|---|
| PATENT NO. | : 10,691,586 B2 | Page 1 of 1 |
| APPLICATION NO. | : 16/048027 | |
| DATED | : June 23, 2020 | |
| INVENTOR(S) | : Nuotio et al. | |

It is certified that error appears in the above-identified patent and that said Letters Patent is hereby corrected as shown below:

On the Title Page

Page 2, Column 1, US Patent Documents, Citation 7:
"US2015/0134892 Coda"
Should read:
-- US2015/0134892 Goda --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*